US012769312B2

(12) United States Patent
Kim et al.

(10) Patent No.: US 12,769,312 B2
(45) Date of Patent: Oct. 20, 2026

(54) ELECTRONIC APPARATUS AND CONTROL METHOD THEREOF

(71) Applicant: SAMSUNG ELECTRONICS CO., LTD., Suwon-si (KR)

(72) Inventors: Dohoon Kim, Suwon-si (KR); Boseok Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 350 days.

(21) Appl. No.: 18/136,987

(22) Filed: Apr. 20, 2023

(65) Prior Publication Data

US 2023/0315115 A1 Oct. 5, 2023

Related U.S. Application Data

(63) Continuation of application No. PCT/KR2021/014083, filed on Oct. 13, 2021.

(30) Foreign Application Priority Data

Oct. 23, 2020 (KR) ........................ 10-2020-0138621

(51) Int. Cl.

*G05D 1/00* (2024.01)
*A47L 9/00* (2006.01)
*A47L 9/28* (2006.01)

(52) U.S. Cl.

CPC ............ *G05D 1/0223* (2013.01); *A47L 9/009* (2013.01); *A47L 9/2805* (2013.01); *A47L 9/2852* (2013.01);

(Continued)

(58) Field of Classification Search

CPC .. G05D 1/0223; G05D 1/0246; G05D 1/0274; G05D 1/243; G05D 1/246;

(Continued)

(56) References Cited

U.S. PATENT DOCUMENTS 10,155,312 B2 12/2018 Feldmann et al.
10,296,002 B2 5/2019 Maeno (Continued)

FOREIGN PATENT DOCUMENTS

JP 2005-211478 A 8/2005
JP 2009208677 A * 9/2009

(Continued)

OTHER PUBLICATIONS

Machine Translation JP 2009294934 (Year: 2009).*

(Continued)

*Primary Examiner* — Anne Marie Antonucci
*Assistant Examiner* — Wesam Almadhrhi
(74) *Attorney, Agent, or Firm* — Sughrue Mion, PLLC

(57) ABSTRACT

An electronic apparatus includes a sensor and a processor configured to acquire distance information about a distance of the electronic apparatus to a sensed obstacle in a different direction based on a travel direction of the electronic apparatus and sensing data received from the sensor during a travel of the electronic apparatus, identify a viewing angle of the electronic apparatus based on the acquired distance information, and adjust a travel velocity of the electronic apparatus based on the identified viewing angle being less than a threshold value.

18 Claims, 9 Drawing Sheets

(52) U.S. Cl.
CPC ......... *G05D 1/0246* (2013.01); *G05D 1/0274* (2013.01); *A47L 2201/04* (2013.01)

(58) Field of Classification Search
CPC ...... G05D 1/622; G05D 1/65; G05D 2105/10; G05D 2107/40; G05D 2109/10; G05D 2111/10; G05D 2101/10; G05D 1/6445; A47L 9/009; A47L 9/2805; A47L 9/2852; A47L 2201/04; A47L 9/2831; A47L 11/4061; A47L 11/4011; G06V 20/58; G06F 18/00
See application file for complete search history.

(56) References Cited

U.S. PATENT DOCUMENTS

| | | | |
|---|---|---|---|
| 10,750,918 | B2 | 8/2020 | Jung et al. |
| 11,526,170 | B2 | 12/2022 | Li et al. |
| 2005/0171638 | A1 | 8/2005 | Uehigashi et al. |
| 2017/0156560 | A1 | 6/2017 | Jung et al. |
| 2017/0261985 | A1 | 9/2017 | Maeno |
| 2018/0239355 | A1 | 8/2018 | Lee et al. |
| 2019/0133395 | A1 | 5/2019 | Jung et al. |
| 2019/0220020 | A1 | 7/2019 | Macias et al. |
| 2020/0293048 | A1 | 9/2020 | Li et al. |

FOREIGN PATENT DOCUMENTS

| | | | |
|---|---|---|---|
| JP | 2009294934 | A | * 12/2009 |
| JP | 2015-219802 | A | 12/2015 |
| JP | 2017-167601 | A | 9/2017 |
| KR | 10-0826881 | B1 | 5/2008 |
| KR | 10-1140984 | B1 | 5/2012 |
| KR | 10-1338246 | B1 | 12/2013 |
| KR | 10-1382982 | B1 | 4/2014 |
| KR | 10-2016-0003435 | A | 1/2016 |
| KR | 10-1864948 | B1 | 7/2018 |
| WO | 2019/085567 | A1 | 5/2019 |
| WO | 2020056108 | A1 | 3/2020 |

OTHER PUBLICATIONS

Supplementary European Search Report issued Jan. 30, 2024 by the European Patent Office for EP Patent Application No. 21883100.6.

International Search Report (PCT/ISA/210) issued by the International Searching Authority on Jan. 25, 2022 in corresponding International Application No. PCT/KR2021/014083.

Written Opinion (PCT/ISA/237) issued by the International Searching Authority on Jan. 25, 2022 in corresponding International Application No. PCT/KR2021/014083.

Communication issued on Feb. 27, 2025 by the Korean Intellectual Property Office for Korean Patent Application No. 10-2020-0138621.

Communication dated Jun. 10, 2025 issued by the European Patent Office in European Patent Application No. 21883100.6.

Communication dated May 8, 2026, issued by the European Patent Office in European Application No. 21883100.6.

* cited by examiner

ELECTRONIC APPARATUS AND CONTROL METHOD THEREOF

CROSS-REFERENCE TO RELATED APPLICATION(S)

This application is a bypass continuation of International Application No. PCT/KR2021/014083, field on Oct. 12, 2021, in the Korean Intellectual Property Receiving Office, which is based on and claims priority to Korean Patent Application No. 10-2020-0138621, filed on Oct. 23, 2020, in the Korean Intellectual Property Office, the disclosures of which are incorporated herein by reference in their entireties.

BACKGROUND

1. Field

The disclosure relates to an electronic apparatus and a control method thereof, and more particularly, to an electronic apparatus that travels in a space and a control method thereof.

2. Description of Related Art

Various types of electronic apparatuses have been developed in accordance with development of electronic technology.

In particular, various types of robot devices traveling in a space and performing a specific action have become popular, such as a serving robot replacing a person in a store, a cafe, a restaurant, etc., a robot vacuum cleaner automatically cleaning an area to be cleaned by suctioning a foreign material while traveling on its own even without a user's separate operation, etc.

In related art, a device traveling in a space may travel only at a predetermined travel velocity, or perform a travel at a reduced velocity or a stop operation only when recognizing an obstacle.

In this case, the robot device is unable to properly address an unexpected situation, such as a sudden appearance of an unexpected obstacle. Accordingly, it may take a predetermined amount of time for the robot device to continue its traveling at an existing travel velocity or to perform the stop operation after recognizing the obstacle, which may increase a probability of collision occurring between the obstacle and the robot device.

SUMMARY

Provided is an electronic apparatus that may efficiently and stably travel in a space, and a control method thereof.

Additional aspects will be set forth in part in the description which follows and, in part, will be apparent from the description, or may be learned by practice of the presented embodiments.

According to an aspect of the disclosure, an electronic apparatus may include a sensor and a processor configured to acquire distance information about a distance of the electronic apparatus to a sensed obstacle in a different direction based on a travel direction of the electronic apparatus and sensing data received from the sensor during a travel of the electronic apparatus, identify a viewing angle of the electronic apparatus based on the acquired distance information, and adjust a travel velocity of the electronic apparatus based on the identified viewing angle being less than a threshold value.

The distance information may include a plurality of distance values corresponding to different direction, and the processor may be further configured to identify a distance increase section and a distance decrease section based on the plurality of distance values, identify a plurality of directions in which the distance decrease section is changed to the distance increase section, and identify the viewing angle of the electronic apparatus based on the plurality of directions.

The processor may be further configured to identify the viewing angle of the electronic apparatus based on an angle difference between a first direction and a second direction among the plurality of directions.

The apparatus may include a memory configured to store velocity information corresponding to the identified viewing angle, and the processor may be further configured to identify the velocity information corresponding to the identified viewing angle and control the travel velocity of the electronic apparatus based on the identified velocity information.

The processor may be further configured to identify a change in the viewing angle based on the travel of the electronic apparatus in real time, and reduce the travel velocity of the electronic apparatus by a predetermined ratio for a predetermined time based a change ratio of the change in the viewing angle being the threshold value or more.

The processor may be further configured to adjust the travel velocity of the electronic apparatus to a velocity corresponding to the viewing angle identified at an elapsed time point when the predetermined time elapses.

The distance information may include a plurality of distance values corresponding to different directions, and the processor may be further configured to maintain the travel velocity of the electronic apparatus based on a minimum value of the plurality of distance values being a distance threshold or more and adjust the travel velocity of the electronic apparatus based on velocity information corresponding to the identified viewing angle based on the minimum value of the plurality of distance values being less than the distance threshold.

The processor may be further configured to reduce the travel velocity of the electronic apparatus by a predetermined ratio based on the travel direction being changed to a threshold angle or more during the travel of the electronic apparatus and adjust the travel velocity of the electronic apparatus based on velocity information corresponding to a viewing angle corresponding to the changed travel direction.

The apparatus may include a memory configured to store map information corresponding to a travel space of the electronic apparatus, and the processor may be further configured to identify location information of the electronic apparatus on a map based on the map information during the travel of the electronic apparatus, identify a viewing angle corresponding to a current location of the electronic apparatus based on the location information of the electronic apparatus and location information of the sensed obstacle, the location information of the sensed obstacle being included in the map information, and adjust the travel velocity of the electronic apparatus based on the viewing angle corresponding to the current location.

The apparatus may include a memory configured to store map information corresponding to a travel space of the electronic apparatus, and the processor may be further configured to identify a travel path of the electronic apparatus based on the map information and control the travel of the electronic apparatus based on the identified travel path.

According to an aspect of the disclosure, a control method of an electronic apparatus may include acquiring distance information about a distance of the electronic apparatus to a sensed obstacle in a different direction based on a travel direction of the electronic apparatus and sensing data received from a sensor during a travel of the electronic apparatus, identifying a viewing angle of the electronic apparatus based on the acquired distance information and adjusting a travel velocity of the electronic apparatus based on the identified viewing angle being less than a threshold value.

The distance information may include a plurality of distance values corresponding to different directions, and the identifying of the viewing angle may include identifying a distance increase section and a distance decrease section based on the plurality of distance values, identifying a plurality of directions in which the distance decrease section is changed to the distance increase section and identifying the viewing angle of the electronic apparatus based on the plurality of directions.

The identifying of the viewing angle may include identifying the viewing angle of the electronic apparatus based on an angle difference between a first direction and a second direction among the plurality of directions.

The electronic apparatus may include velocity information corresponding to the identified viewing angle, and the adjusting of the travel velocity may include identifying the velocity information corresponding to the identified viewing angle, and controlling the travel velocity of the electronic apparatus based on the identified velocity information.

The control method may include identifying a change in the viewing angle based on the travel of the electronic apparatus in real time and reducing the travel velocity of the electronic apparatus by a predetermined ratio for a predetermined time based on a change ratio of the viewing angle being the threshold value or more.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
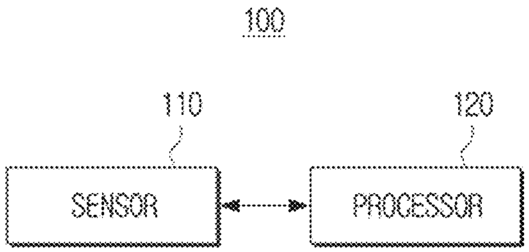
FIG. 1 is a diagram of a configuration of an electronic apparatus according to an embodiment of the present disclosure.

Terms used in the present specification are briefly described, and the present disclosure will then be described in detail.

General terms that are currently widely used are selected as terms used in embodiments of the present disclosure in consideration of their functions in the present disclosure, and may be changed based on intentions of those skilled in the art or a judicial precedent, the emergence of a new technique, etc. In addition, in a specific case, terms arbitrarily chosen by an applicant may exist. In this case, the meanings of such terms are mentioned in detail in corresponding description portions of the present disclosure. Therefore, the terms used in the present disclosure need to be defined based on the meanings of the terms and the contents throughout the present disclosure rather than simple names of the terms.

The present disclosure may be variously modified and have various embodiments, and specific embodiments of the present disclosure will be shown in the drawings and described in detail in the detailed description. However, it is to be understood that the present disclosure is not limited to the specific embodiments, and includes all modifications, equivalents, and substitutions without departing from the scope and spirit of the present disclosure. When it is decided that a detailed description for the known art related to the present disclosure may obscure the gist of the present disclosure, the detailed description will be omitted.

Terms "first," "second," and the like, may be used to describe various components. However, the components are not to be construed as being limited by these terms. The terms are used only to distinguish one component from another component.

A term of a singular number may include its plural number unless explicitly indicated otherwise in the context. It is to be understood that a term "include," "formed of," or the like used in the present application specifies the presence of features, numerals, steps, operations, components, parts, or combinations thereof, which is mentioned in the specification, and does not preclude the presence or addition of one or more other features, numerals, steps, operations, components, parts, or combinations thereof.

In the embodiments, a "module" or a "~er/~or" may perform at least one function or operation, and be implemented by hardware, software, or a combination of hardware and software. In addition, a plurality of "modules" or a plurality of "~ers/~ors" may be integrated in at least one module and implemented by at least one processor except for a "module" or a "~er/or" that needs to be implemented by specific hardware.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, the embodiments of the present disclosure will be described in detail with reference to the accompanying drawings so that those skilled in the art to which the present disclosure pertains may easily practice the present disclosure. However, the present disclosure may be modified in various different forms, and is not limited to the embodiments provided in the specification. In addition, in the drawings, portions unrelated to the description are omitted to clearly describe the present disclosure, and similar portions are denoted by similar reference numerals throughout the specification.

FIG. 1 is a diagram of a configuration of an electronic apparatus according to an embodiment of the present disclosure.

As shown in FIG. 1, an electronic apparatus 100 according to an embodiment of the present disclosure may be implemented as various types of devices, such as a user terminal apparatus, a display apparatus, a set-top box, a tablet personal computer (PC), a smartphone, an e-book reader, a desktop PC, a laptop PC, a workstation, a server, a personal digital assistant (PDA), a portable multimedia player (PMP), a moving picture experts group (MPEG) audio layer-3 (MP3) player or a kiosk. However, this implementation may be an example, and the electronic apparatus 100 may be implemented as various types of electronic apparatuses such as a wearable device corresponding to at least one of an accessory type (e.g., watch, ring, bracelet, anklet, necklace, glasses or contact lens), a head-mounted-device (HMD)) or a textile/clothing integral type (e.g., electronic clothing), a robot including a driver, a projector or a server.

The electronic apparatus 100 according to an embodiment of the present disclosure may be implemented as a robot. The robot may refer to various types of machines having ability to perform work for itself. For example, the robot may refer to a smart machine sensing its surrounding environment in real time based on a sensor, camera, etc., and may collect information to autonomously operate in addition to a simple repetitive function.

The robot may have the driver including an actuator or a motor. A robot according to an embodiment may control motion of a robot joint (or articulation) by using the driver. The driver may include a wheel, a brake, etc., and the robot may be implemented as a mobile robot which may move in a specific space for itself by using the driver. In addition, the robot joint may refer to one component of the robot that replaces a function of a human arm or hand.

The robot may be classified into a robot for industrial, medical, household, military, or exploration usage based on its field or its function that may be performed. According to an embodiment, the industrial robot may be subdivided into a robot used in a product-manufacturing process of a factory, a robot serving a customer in a store or a restaurant, a robot receiving an order and providing the serving, etc. For example, the electronic apparatus 100 according to an embodiment of the present disclosure may be implemented as a serving robot capable of transporting service items to location desired by a user or to specific location in various places such as a restaurant, a hotel, a mart, a hospital, and a clothing store. However, this implementation is only an example, and the robot may be classified in various types based on its application field, function, and purpose of use, and is not limited to the above-described examples.

For example, the electronic apparatus 100 may be implemented as a cleaning robot. The cleaning robot may indicate a device driven by electric power and automatically suctioning a foreign material. Hereinafter, for convenience of explanation, it is assumed that the electronic apparatus 100 is the cleaning robot, and the cleaning robot is implemented as a flat-type in close contact with a floor to suction the foreign material on the floor. However, this implementation is only an example, and the electronic apparatus 100 may be implemented as various types of robots and home appliances that may perform their travels.

Referring to FIG. 1, the electronic apparatus 100 may include a sensor 110 and a processor 120.

The sensor 110 may be implemented as a camera, and the camera may be implemented as a red/green/blue (RGB) camera, a three-dimensional (3D) camera, etc.

The camera is a component for capturing a still image or a moving image. The camera may capture a still image at a specific time point, and also continuously capture still images. The electronic apparatus 100 according to an embodiment of the present disclosure may acquire information about a distance of the electronic apparatus 100 to a sensed obstacle in a different direction based on its travel direction based on sensing data received from the sensor 110.

For example, the processor 120 included in the electronic apparatus 100 may sense an object positioned adjacent to the electronic apparatus 100 based on the sensing data received from the sensor 110. For example, the electronic apparatus 100 may acquire a front image of the electronic apparatus 100 through the camera which is an example of implementation of the sensor 110, and identify the object located in the travel direction of the electronic apparatus 100 based on the acquired image. The object may indicate various things or situations that may interfere with the travel of the electronic apparatus 100 or cause a driving stop, damage, or failure of the electronic apparatus 100 during its travel. For example, when the electronic apparatus 100 travels in a specific space in a private house, the object may be implemented in various types such as furniture, electronic devices, rugs, clothes, walls, stairs, and thresholds.

The sensor 110 may be implemented in various types in addition to the camera. For example, the sensor 110 may be implemented as an ultrasonic sensor, an infrared sensor, etc. According to an embodiment, when the sensor 110 is implemented as the ultrasonic sensor, the electronic apparatus 100 may control the ultrasonic sensor to emit ultrasonic pulses. Subsequently, when receiving a reflected wave of the ultrasonic pulse that is reflected from the object, the electronic apparatus 100 may measure a distance between the object and the electronic apparatus 100 by measuring an elapsed time between the waves. In addition, the ultrasonic sensor may be implemented in various types including an ultrasonic proximity sensor. The infrared sensor is an element that senses infrared light information of the object. The electronic apparatus 100 may identify the object or measure the distance between the object and the electronic apparatus 100 based on the infrared light information acquired through the infrared sensor.

An implementation of the sensor 110 is not limited to the above-described examples.

The electronic apparatus 100 according to an embodiment of the present disclosure may analyze the presence or absence of the object, position of the object, the distance to the object, etc., based on the sensing data of the sensor 110, and adjust a travel path (or movement path), travel velocity, etc., of the electronic apparatus 100 based on an analysis result. Hereinafter, for convenience of explanation, the objects are collectively referred to as the obstacle.

The processor 120 may control overall operations of the electronic apparatus 100.

According to an embodiment, the processor 120 may be implemented as a digital signal processor (DSP), a microprocessor, an artificial intelligence (AI) processor, or a timing controller (T-CON) for processing a digital video signal. However, the processor 120 is not limited thereto, and may include one or more of a central processing unit (CPU), a micro controller unit (MCU), a micro processing unit (MPU), a controller, an application processor (AP), a communication processor (CP), and an ARM processor, or may be defined by these terms. In addition, the processor 120 may be implemented in a system-on-chip (SoC) or a large scale integration (LSI) in which a processing algorithm is embedded, or may be implemented in a field programmable gate array (FPGA).

The processor 120 according to an embodiment of the present disclosure may acquire the information about the distance to the sensed obstacle in the different direction based on the travel direction of the electronic apparatus 100 based on the sensing data received from the sensor 110.

For example, a sensor driver including the motor may be positioned at a lower side of the sensor 110, and the sensor driver may rotate the sensor 110 left and right. In this case, the sensor 110 may sense the obstacle while rotating back and forth based on a reference direction. For example, the sensor 110 may rotate back and forth in a range of ±α° (i.e. total range of 2α°) from the reference direction, and transmit the acquired sensing data to the processor 120, and the processor 120 may sense the presence or absence of the obstacle, the distance to the obstacle, etc., based on the sensing data. The reference direction may indicate the travel direction of the electronic apparatus 100.

Figure 2:
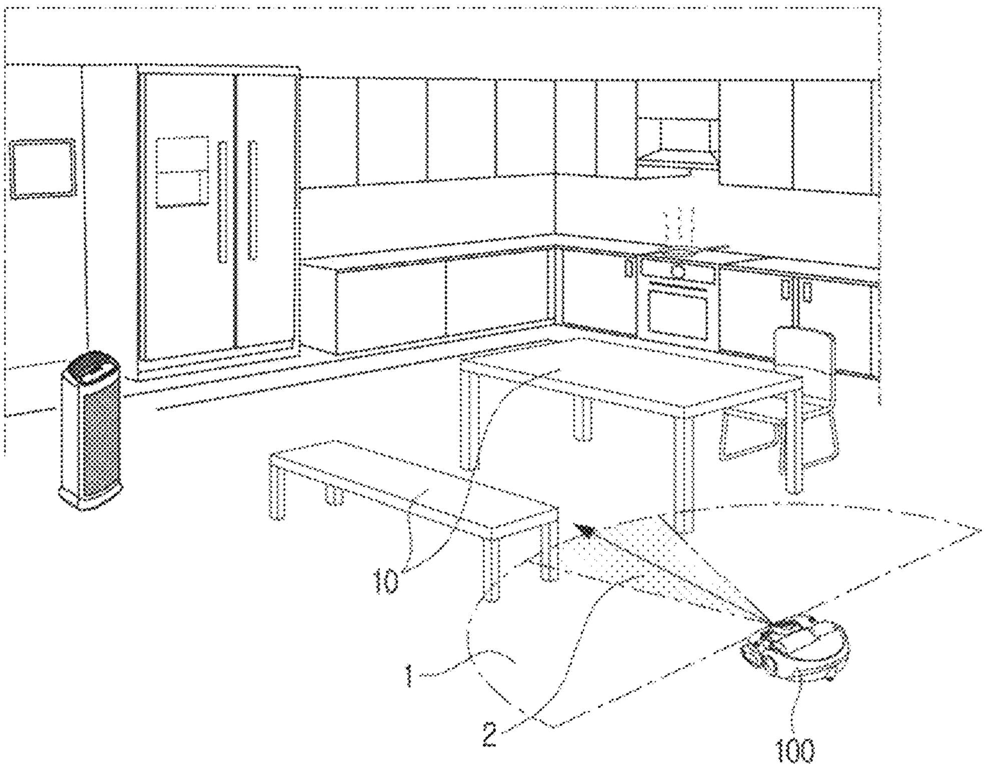
FIG. 2 is a diagram of a travel path according to an embodiment of the present disclosure.

A detailed description thereof is provided with reference to FIG. 2.

FIG. 2 is a diagram of a travel path according to an embodiment of the present disclosure.

Referring to FIG. 2, the processor 120 may control the electronic apparatus 100 to perform its travel and the sensor 110 to sense a region corresponding to the range of ±α° (i.e. total range of 2α°) based on the travel direction. The electronic apparatus 100 (i.e., the sensor 110 of the electronic apparatus) may have sensing region 1 and viewing angle 2. Sensing region 1 and viewing angle 2 of the sensor 110 may be the same as each other or different from each other.

In the above example, for convenience of explanation, it is assumed and described that the sensor 110 moves α° to the left and α° to the right to sense a region corresponding to the total range of 2α°, this range is only an example, and may be changed in various ways based on an implementation type of the sensor 110. For example, the sensor 110 may also be implemented to sense the region corresponding to the range of ±α° (i.e. total range of 2α°), based on the travel direction of the electronic apparatus 100 while the sensor 110 is fixed without rotating back and forth. In addition, α° may indicate 90°, and in this case, the sensor 110 may sense an obstacle 10 located in a total range of 180° and a distance to the obstacle 10. A specific number is only an example, and the present disclosure is not limited thereto. For example, the sensor 110 may sense a region corresponding to a range from 45° to the left to 45° to the right (i.e. total range of 90°) based on the travel direction.

The processor 120 according to an embodiment of the present disclosure may acquire information about the distance to the sensed obstacle 10 in the left direction and the right direction based on the travel direction based on the sensing data. Subsequently, the processor 120 may identify a viewing angle 2 of the electronic apparatus based on the acquired distance information. A detailed description thereof is provided with reference to FIG. 3.

Figure 3:
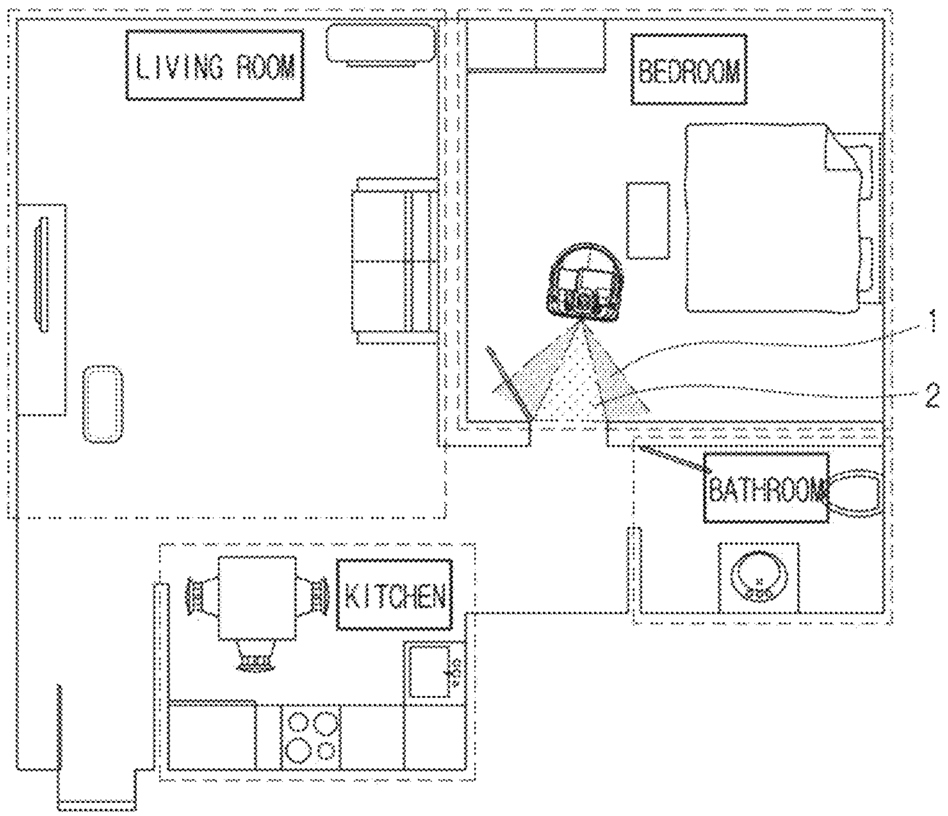
FIG. 3 is a diagram of distance information according to an embodiment of the present disclosure.

FIG. 3 is a diagram of distance information according to an embodiment of the present disclosure.

Referring to FIG. 3, the sensor 110 may sense the region corresponding to a range from 90° to the left to 90° to the right (i.e. total range of 180°) based on the travel direction. Accordingly, the sensing data may include the obstacle 10 located in the range of 180° and the information about the distance to the obstacle 10.

Subsequently, the processor 120 may acquire the information about the distance to the obstacle 10 based on the sensing data, and then identify the viewing angle 2 of the electronic apparatus 100 based on the information about the distance to the obstacle 10.

The viewing angle 2 may indicate an angle at which a view of the sensor 110 is not blocked by the obstacle 10 when the sensor 110 senses the region corresponding to the range of ±90° based on the travel direction of the electronic apparatus 100. The viewing angle 2 may be referred to as an observation angle, a field of view (FOV), etc., and collectively referred to as the viewing angle 2 hereinafter for convenience of explanation. In addition, the region corresponding to the range of 180° sensed by the sensor 110 may be collectively referred to as a sensing region 1.

According to various embodiments of the present disclosure, the sensing region 1 and the viewing angle 2 of the sensor 110 may be the same as each other or different from each other. FIG. 3 assumes and shows a case where the sensing region 1 and the viewing angle 2 of the sensor 110 are different from each other according to an embodiment.

According to an embodiment, the processor 120 may adjust the travel velocity of the electronic apparatus 100 when the identified viewing angle 2 is less than a threshold value.

For example, the processor 120 may control the electronic apparatus 100 to perform a travel at a reduced velocity when the viewing angle 2 is less than the threshold value as there is a region where the view of the sensor is limited by the obstacle 10 among the sensing regions 1 of the sensor 110. A situation where the view of the sensor is limited by the obstacle 10 may indicate that there is a high probability of an unexpected situation where the unexpected obstacle 10 appears in the travel direction of the electronic apparatus 100, and a high probability of collision between electronic apparatus 100 and unexpected obstacle 10. The processor 120 may prevent a collision accident by controlling the electronic apparatus 100 to perform the travel at a reduced velocity. The unexpected obstacle 10 may indicate the obstacle 10 not sensed by the sensor 110, the obstacle 10 not included in map information pre-stored in the electronic apparatus 100, etc.

Hereinafter, various methods are described for the processor 120 to identify the viewing angle 2 of the electronic apparatus 100 based on the distance information.

Figure 4:
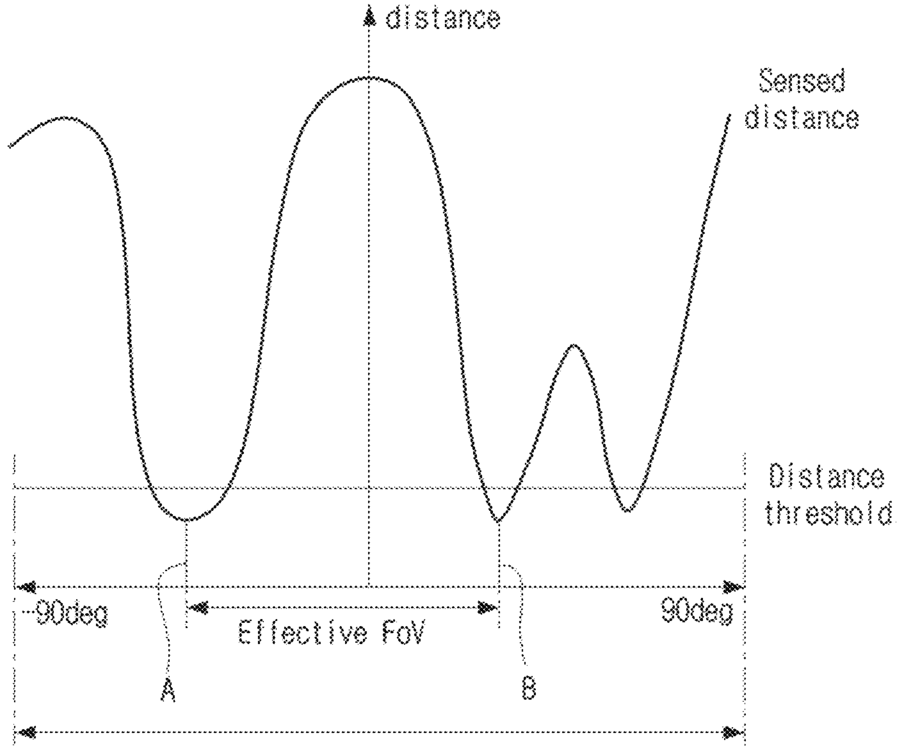
FIG. 4 is a diagram of a viewing angle according to an embodiment of the present disclosure.

FIG. 4 is a diagram of a viewing angle according to an embodiment of the present disclosure.

Referring to FIG. 4, the processor 120 may acquire the information about the distance to the sensed obstacle 10 in various directions based on the travel direction and based on the sensing data.

For example, the processor 120 may acquire the information about the distance to the obstacle 10 in the total range of 180° from a range from −90° to +90°. The distance information may include a plurality of distance values corresponding to the different directions (e.g., direction in the range from −90° to +90° based on the travel direction).

The processor 120 according to an embodiment may identify a distance increase section and a distance decrease section based on the plurality of distance values. Subsequently, the processor 120 may identify a plurality of directions in which the distance decrease section is changed to the distance increase section.

Referring to FIGS. 3 and 4, a change in the distance between the electronic apparatus 100 and the obstacle 10 is described in detail as follows.

According to an example, the distance between the electronic apparatus 100 and the obstacle 10 may be gradually decreased and then be increased again in each direction corresponding to a range from +90° to zero°. In this case, the processor 120 may identify a first direction (or a specific angle) in which the distance decrease section is changed to the distance increase section. Subsequently, the processor 120 may identify a distance corresponding to the identified first direction. For example, the processor 120 may identify that distance A is the distance between the electronic apparatus 100 and the obstacle 10 that corresponds to the first direction in the range from −90° to zero°.

In addition, the distance between the electronic apparatus 100 and the obstacle 10 may be gradually decreased and then be increased again in each direction corresponding to a range from +90° to zero°. In this case, the processor 120 may identify a second direction (or a specific angle) in which the distance decrease section is changed to the distance increase section. For example, the processor 120 may identify that distance B is the distance between the electronic apparatus 100 and the obstacle 10 that corresponds to the second direction in the range from +90° to zero°.

Referring to FIG. 4, distance A and distance B may each be less than a distance threshold (or distance threshold value). The distance threshold may be a value set by a manufacturer or a user. The processor 120 may identify the viewing angle 2 of the electronic apparatus 100 based on an angle difference between the first and second directions when distance A and distance B are each less than the distance threshold (or the distance threshold value). For example, the viewing angle 2 may be 90° when the first direction is −45° (i.e. 45° to the left) and the second direction is +45° (i.e. 45° to the right 45°). Referring to FIG. 4, the viewing angle 2 corresponding to the angle difference between the first direction and the second direction may also be referred to as an effective field of view (FoV), which is different from the sensing region 1 of the sensor 110.

The processor 120 may identify the viewing angle 2 based on the angle difference between the first direction in which the distance between the obstacle 10 and the electronic apparatus 100 is the closest in the range from −90° to zero° and the second direction in which the distance between the obstacle 10 and the electronic apparatus 100 is the closest in the range from 90° to zero°. Zero° may correspond to the travel direction.

The processor 120 according to an embodiment may control the electronic apparatus 100 to perform the travel at a reduced velocity when the identified viewing angle 2 is less than the distance threshold. For example, the electronic apparatus 100 may further include a memory storing velocity information corresponding to each of the plurality of viewing angles 2. The velocity information corresponding to each of the plurality of viewing angles 2 may have the form of a lookup table or algorithm.

Accordingly, the processor 120 according to an embodiment of the present disclosure may adjust the travel velocity of the electronic apparatus 100 based on the velocity information corresponding to the identified viewing angle 2 when the minimum value of the plurality of distance values corresponding to the different directions included in the distance information is less than the distance threshold.

Figure 5:
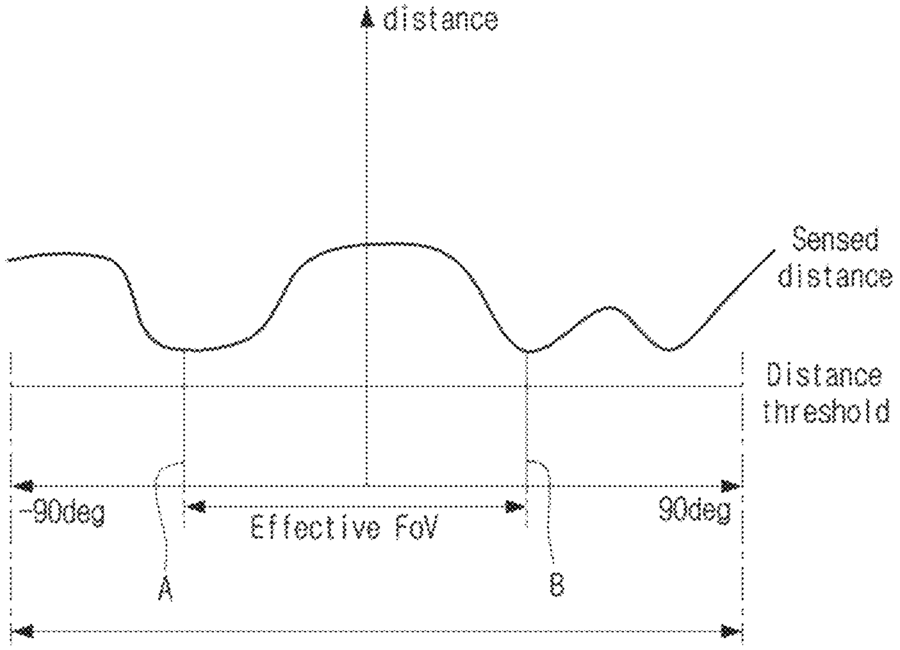
FIG. 5 is a diagram of a viewing angle according to an embodiment of the present disclosure.

FIG. 5 is a diagram of a viewing angle according to an embodiment of the present disclosure.

Referring to FIG. 5, it may be assumed that unlike FIG. 3, the distance between the obstacle 10 and the electronic apparatus 100 is relatively long although the obstacle 10 is located in the sensing region 1.

In this case, the probability that the collision occurs between the electronic apparatus 100 and the unexpected obstacle 10 may be smaller than that of the above-described embodiment.

According to an embodiment of the present disclosure, distance A and distance B may each be the distance threshold (or distance threshold value). For example, the processor 120 may maintain the travel velocity of the electronic apparatus 100 when the minimum value of the plurality of distance values corresponding to the different directions included in the distance information is the distance threshold or more.

For example, the processor 120 may maintain the basic travel velocity when a basic travel velocity of the electronic apparatus 100 may be 32 cm/s, and the viewing angle 2 is the threshold value or more.

For another example, when the viewing angle 2 is less than the threshold value, the processor 120 may control the electronic apparatus 100 to travel at a travel velocity corresponding to the viewing angle 2.

For still another example, when the viewing angle 2 is less than the threshold value, the processor 120 may control the electronic apparatus 100 to travel at a velocity reduced from the basic travel velocity, for example, 20 cm/s, regardless of the viewing angle 2.

For yet another example, when the viewing angle 2 is less than the threshold value, the processor 120 may control the electronic apparatus 100 to travel at a velocity reduced by a predetermined ratio (e.g., 10%) from the basic travel velocity.

In the above example, when the viewing angle 2 is less than the threshold value, it may indicate a case where the electronic apparatus passes through a narrow space (e.g., corridor) or a space in which several obstacles are scattered.

Figure 6:
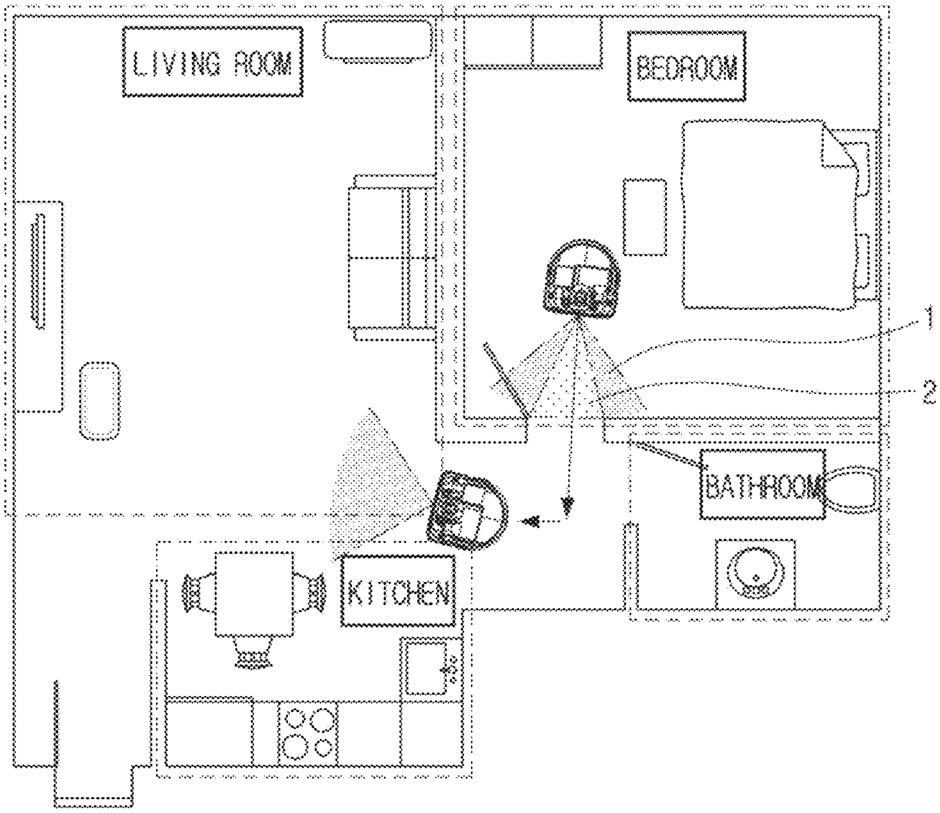
FIG. 6 is a diagram of the viewing angle and a travel direction according to an embodiment of the present disclosure.

FIG. 6 is a diagram of the viewing angle and a travel direction according to an embodiment of the present disclosure.

The processor 120 according to an embodiment of the present disclosure may reduce the travel velocity of the electronic apparatus 100 by a predetermined ratio to prevent the collision with the unexpected obstacle 10 when the viewing angle 2 is changed rapidly or when the travel direction changes rapidly based on the travel of the electronic apparatus 100.

Referring to FIG. 6, according to an embodiment of the present disclosure, it may be assumed that the electronic apparatus 100 performs the travel by following a wall surface in a space. In this case, the travel direction may be changed by about 90° as the electronic apparatus 100 performs the travel by following the wall surface.

The processor 120 according to an embodiment of the present disclosure may reduce the travel velocity of the electronic apparatus 100 by the predetermined ratio when the travel direction is changed to a threshold angle or more during the travel of the electronic apparatus 100 in addition to the identified viewing angle 2.

For example, the processor 120 may control the electronic apparatus 100 to perform the travel at 27 cm/s which is the reduced velocity by a predetermined ratio (e.g., 10%) when 30 cm/s is the travel velocity corresponding to the currently identified viewing angle 2 and the travel direction of the electronic apparatus is changed to the threshold angle or more.

Subsequently, the processor 120 may adjust the travel velocity of the electronic apparatus based on the velocity information corresponding to the viewing angle 2 identified based on the changed travel direction. For example, the processor 120 may control the electronic apparatus 100 to perform the travel at the reduced velocity when the change in the travel direction based on the travel of the electronic apparatus 100 is sensed and the travel direction is changed to the threshold angle or more.

For another example, the processor 120 may control the electronic apparatus 100 to perform the travel at the velocity corresponding to the currently identified viewing angle 2 when the change in the travel direction based on the travel of the electronic apparatus 100 is sensed and the travel direction is changed to the threshold angle or more.

For still another example, the processor 120 may control the electronic apparatus 100 to perform the travel at a velocity corresponding to a newly identified viewing angle 2 based on the changed travel direction when it is sensed that the travel direction based on the travel of the electronic apparatus 100 is changed, and a predetermined time elapses or the change in the travel direction is completed.

The processor 120 according to an embodiment of the present disclosure may identify the viewing angle 2 changed based on the travel of the electronic apparatus 100 in real time.

Subsequently, the processor 120 may reduce the travel velocity of the electronic apparatus 100 by the predetermined ratio for the predetermined time when a change ratio of the viewing angle 2 is the threshold value or more. For example, it may be assumed that the electronic apparatus 100 performs a sharp corner travel or a travel between the plurality of obstacles 10. In this case, when the change ratio of the viewing angle 2 is the threshold value or more, the processor 120 may control the electronic apparatus 100 to perform the travel at the reduced velocity by the predetermined ratio than the velocity corresponding to the currently identified viewing angle 2 to prevent the collision with the unexpected obstacle. For example, when the viewing angle 2 is changed by +20° or more, or increased or decreased by 10% or more, the processor 120 may control the electronic apparatus 100 to perform the travel at the reduced velocity by the predetermined ratio (e.g., 10%) than the velocity corresponding to the identified viewing angle 2.

When the predetermined time elapses, the processor 120 according to an embodiment of the present disclosure may control the electronic apparatus 100 to perform the travel at the travel velocity changed to the basic travel velocity or at the velocity corresponding to the currently identified viewing angle 2.

Figure 7:
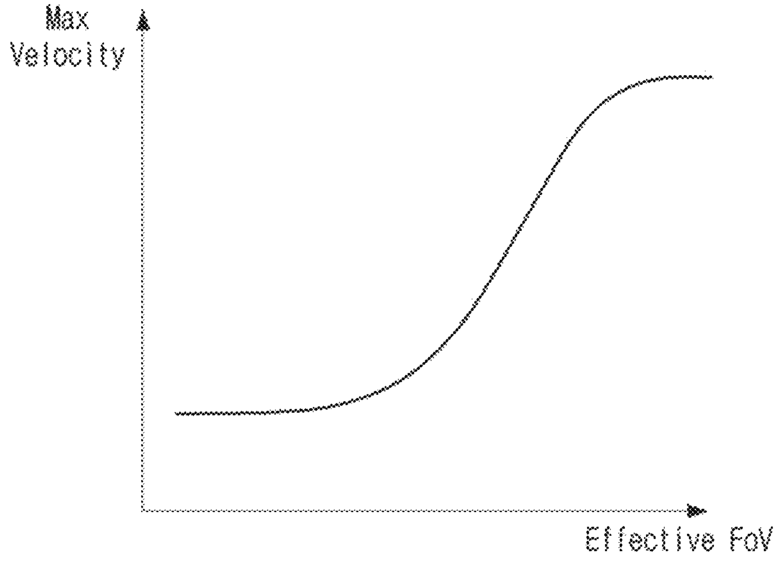
FIG. 7 is a graph of a travel velocity according to an embodiment of the present disclosure.

FIG. 7 is a graph of a travel velocity according to an embodiment of the present disclosure.

Referring to FIG. 7, an x-axis represents the viewing angle 2 and a y-axis represents the velocity.

Referring to the graph of FIG. 7, the electronic apparatus 100 according to an embodiment of the present disclosure may further includes the memory storing the velocity information corresponding to each of the plurality of viewing angles 2. The processor 120 according to an embodiment may identify the velocity information corresponding to the identified viewing angle, and control the travel velocity of the electronic apparatus 100 based on the identified velocity information.

As the viewing angle 2 is increased, the travel velocity of the electronic apparatus 100 may also be increased approximately proportionally thereto. The probability of collision with the unexpected obstacle may be small when the viewing angle 2 is great, and the electronic apparatus 100 may thus perform the travel faster than when the viewing angle 2 is small.

FIG. 7 shows that the travel velocity is increased proportionally to the viewing angle 2 as an example, and the present disclosure is not limited thereto. For example, when the viewing angle 2 is the specific angle or more, the travel velocity of the electronic apparatus 100 may correspond to the basic travel velocity. For another example, when the viewing angle is the specific angle or more, the travel velocity of the electronic apparatus 100 may correspond to the velocity reduced by the predetermined ratio than the basic travel velocity.

Figure 8:
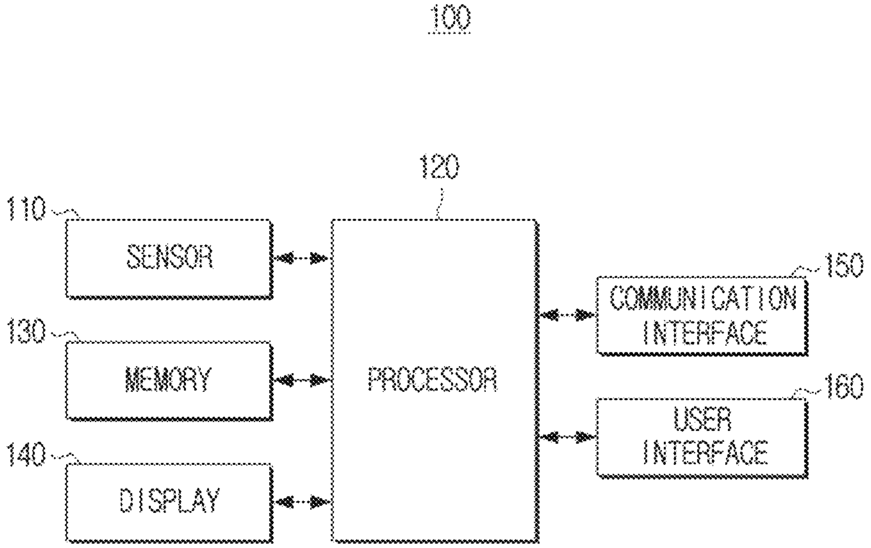
FIG. 8 is a diagram of a configuration of the electronic apparatus according to an embodiment of the present disclosure.

FIG. 8 is a diagram of a configuration of the electronic apparatus according to an embodiment of the present disclosure.

The electronic apparatus 100 according to an embodiment of the present disclosure may include the sensor 110, the processor 120, a memory 130, a display 140, a communication interface 150, and a user interface 160.

As described above, the sensor 110 may be implemented as the camera or the detection sensor of various types. For example, the camera may be implemented as the RGB camera, the 3D camera, etc. The 3D camera may be implemented as a time of flight (TOF) camera including a TOF sensor and an infrared light. The 3D camera may include an infrared (IR) stereo sensor. The camera may include a sensor such as a charge-coupled device (CCD) or a complementary metal-oxide semiconductor (CMOS), and is not limited thereto. When the camera includes the CCD, the CCD may be implemented as a red/green/blue (RGB) CCD, an infrared (IR) CCD, etc.

The memory 130 may include a read only memory (ROM), a random access memory (RAM) (e.g., dynamic RAM (DRAM), synchronous DRAM (SDRAM), double data rate SDRAM (DDR SDRAM)), etc., and may be implemented together with the processor 120 in one chip.

The memory 130 may store the velocity information corresponding to each of the plurality of viewing angles 2 as shown in FIG. 7.

In addition, the memory 130 may pre-store the map information corresponding to the travel space of the electronic apparatus 100.

In the map information, the space (e.g., private house) may be divided into a plurality of zones (e.g., living room, bedroom, bathroom, or kitchen) by identifying, in the space where the electronic apparatus 100 performs the travel, a point where there is a dividing line or jaw on the floor, a point where a movable width narrows, a point where there is a wall, a point where the wall starts, a point where the wall ends, a point where there is a door, etc., and the map information may include information about the size and shape of each of a plurality of zones, and information about the size and shape of each of the plural zones, and information about the size, shape, and location of the obstacle (e.g., furniture or appliance) located in each zone.

The processor 120 according to an embodiment of the present disclosure may identify location information of the electronic apparatus 100 based on the map information stored in the memory 130 during the travel of the electronic apparatus 100. Subsequently, the processor 120 may identify the viewing angle 2 corresponding to current location of the electronic apparatus 100 based on the location information of the electronic apparatus and location information of the obstacle included in the map information. Subsequently, the processor 120 may adjust the travel velocity of the electronic apparatus 100 based on the identified viewing angle 2. Accordingly, the processor 120 may identify the current viewing angle 2 in real time based on the sensing data received through the sensor 110, and also identify the current viewing angle 2 based on the map information and the current location information of the electronic apparatus 100.

The processor 120 may identify the travel path of the electronic apparatus 100 based on the map information stored in the memory 130, and also control the travel of the electronic apparatus 100 based on the identified travel path.

The display 140 may be implemented as a display including a self-light emitting element or a display including a non-light emitting element and a backlight. For example, the display 140 may be implemented in various types of displays such as a liquid crystal display (LCD), an organic light emitting diode (OLED), a light emitting diode (LED), a micro light emitting diode (micro LED), a mini LED, a plasma display panel (PDP), a quantum dot (QD) display, a quantum dot light-emitting diode (QLED). The display 140 may also include a driving circuit, a backlight unit, etc., which may be implemented in a form such as an a-si thin film transistor (TFT), a low temperature poly silicon (LTPS) TFT, an organic TFT (OTFT), etc., The display 140 may be implemented as a touch screen combined with a touch sensor, a flexible display, a rollable display, a 3D display, a display in which a plurality of display modules are physically connected with each other, etc. The processor 120 may control the display 140 to output state information of the electronic apparatus 100 based on the various embodiments described above. The state information may include various information about driving of the electronic apparatus 100, for example, a cleaning mode of the electronic apparatus 100, battery-related information, and whether to return to a docking station 200.

The communication interface 150 is a component for the electronic apparatus 100 to communicate with at least one external device to exchange signals/data. To this end, the communication interface 150 may include a circuit.

The communication interface 150 may include a wireless communication module, a wired communication module, etc.

The communication interface may receive various types of contents. For example, the communication interface may receive the velocity information, the sensing date, etc., by streaming or downloading the contents from the external device (e.g., source device), an external storage medium (e.g., universal serial bus (USB) memory), an external server (e.g., web hard), etc., through a communication method such as an access point (AP)-based wireless fidelity (Wi-Fi, i.e. wireless local area network (LAN)), a Bluetooth, a Zigbee, a wired/wireless LAN, a wide area network (WAN), Ethernet, an IEEE 1394, a high definition multimedia interface (HDMI), a USB, a mobile high-definition link (MHL), an audio engineering society/European broadcasting union (AES/EBU) communication, an optical communication or a coaxial communication.

The user interface 160 may include one or more of a button, a keyboard, a mouse, etc. In addition, the user interface 160 may include a touch panel implemented together with the display or a separate touch pad.

The user interface 160 may include a microphone to receive a user command or information as a voice input, or may be implemented together with the sensor 110 to recognize the user command or information in the form of a motion.

Figure 9:
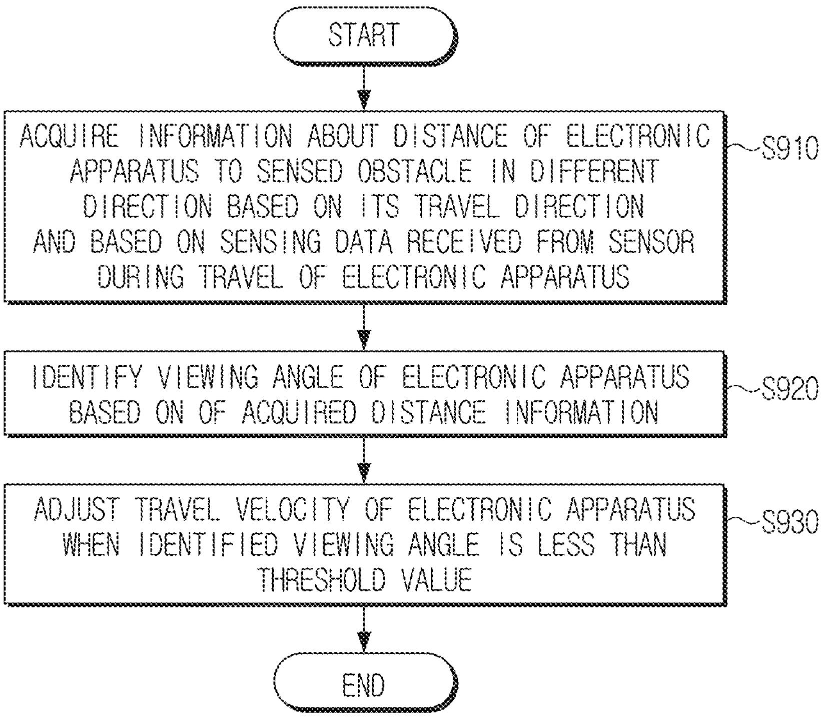
FIG. 9 is a flowchart of a control method of an electronic apparatus according to an embodiment of the present disclosure.

FIG. 9 is a flowchart of a control method of an electronic apparatus according to an embodiment of the present disclosure.

In operation S910, the control method of an electronic apparatus according to an embodiment of the present disclosure may include acquiring information about a distance of the electronic apparatus to a sensed obstacle in a different direction based on the travel direction and further based on sensing data received from a sensor during a travel of the electronic apparatus. In operation S920, the method may include identifying a viewing angle of the electronic apparatus based on the acquired distance information. In operation S930, the method may include adjusting a travel velocity of the electronic apparatus when the identified viewing angle is less than a threshold value.

In the method in which the distance information includes a plurality of distance values corresponding to the different directions, operation S920 of identifying the viewing angle may include identifying a distance increase section and a distance decrease section based on the plurality of distance values, identifying a plurality of directions in which the distance decrease section is changed to the distance increase section, and identifying the viewing angle of the electronic apparatus based on the plurality of identified directions.

Operation S920 of identifying the viewing angle according to an embodiment of the present disclosure may include identifying the viewing angle of the electronic apparatus based on an angle difference between a first direction and a second direction among the plurality of directions.

In addition, in the method in which the electronic apparatus includes velocity information corresponding to each of the plurality of viewing angles, operation S930 of adjusting the travel velocity may include identifying the velocity information corresponding to the identified viewing angle, and controlling the travel velocity of the electronic apparatus based on the identified velocity information.

The control method according to an embodiment of the present disclosure may further include identifying the viewing angle changed based on the travel of the electronic apparatus in real time, and reducing the travel velocity of the electronic apparatus by a predetermined ratio for a predetermined time when a change ratio of the viewing angle is the threshold value or more.

The control method according to an embodiment may further include adjusting the travel velocity of the electronic apparatus to the travel velocity corresponding to the viewing angle identified at an elapsed time point when the predetermined time elapses.

In addition, in the method in which the distance information includes the plurality of distance values corresponding to the different directions, operation S930 of adjusting the travel velocity may include maintaining the travel velocity of the electronic apparatus when the minimum value of the plurality of distance values is a distance threshold or more, and adjusting the travel velocity of the electronic apparatus based on the velocity information corresponding to the identified viewing angle when the minimum value of the plurality of distance values is less than the distance threshold.

The control method according to an embodiment of the present disclosure may further include reducing the travel velocity of the electronic apparatus by the predetermined ratio when the travel direction is changed to a threshold angle or more during the travel of the electronic apparatus, and adjusting the travel velocity of the electronic apparatus based on the velocity information corresponding to the viewing angle identified based on the changed travel direction.

In addition, the control method according to an embodiment in which the electronic apparatus includes map information corresponding to a travel space of the electronic apparatus may further include identifying location information of the electronic apparatus on a map based on the map information during the travel of the electronic apparatus, identifying the viewing angle corresponding to current location of the electronic apparatus based on the location information of the electronic apparatus and location information of the obstacle, included in the map information, and adjusting the travel velocity of the electronic apparatus based on the identified viewing angle.

In addition, the control method according to an embodiment in which the electronic apparatus includes the map information corresponding to the travel space of the electronic apparatus may include identifying a travel path of the electronic apparatus based on the map information, and controlling the travel of the electronic apparatus based on the identified travel path.

The various embodiments described above may be implemented in a computer or a computer-readable recording medium using software, hardware, or a combination of software and hardware. In some cases, the embodiments described in the present disclosure may be implemented by the processor itself. According to a software implementation, the embodiments such as the procedures and functions described in the present disclosure may be implemented by separate software modules. Each of the software modules may perform one or more functions and operations described in the specification.

A non-transitory computer-readable medium may store computer instructions for performing the processing operations of the electronic apparatus 100 according to the various embodiments of the present disclosure described above. The computer instructions stored in the non-transitory computer-readable medium may allow a specific device to perform the processing operations of the electronic apparatus 100 according to the various embodiments described above when the computer instructions are executed by a processor of the specific device.

The non-transitory computer-readable medium is not a medium that stores data therein for a while, such as a register, a cache, or a memory, and indicates a medium that semi-permanently stores data therein and is readable by the machine. A specific example of the non-transitory computer-readable medium may include a compact disk (CD), a digital versatile disk (DVD), a hard disk, a Blue-ray disk, a USB, a memory card, a ROM, etc.

According to the various embodiments of the present disclosure as described above, the electronic apparatus may stably travel in the space considering whether there is a potential risk.

The electronic apparatus may properly respond to the unexpected obstacle, thus effectively preventing the unexpected collision and securing the user safety.

Although the embodiments are shown and described in the present disclosure as above, the present disclosure is not limited to the above-mentioned specific embodiments, and may be variously modified by those skilled in the art to which the present disclosure pertains without departing from the gist of the present disclosure in the accompanying claims. These modifications should also be understood to fall within the scope and spirit of the present disclosure.

What is claimed is:

1. An electronic apparatus comprising:
a sensor; and
a processor configured to:
acquire distance information about a distance of the electronic apparatus to a sensed obstacle in a different direction based on:
a travel direction of the electronic apparatus, and
sensing data received from the sensor during a travel of the electronic apparatus,
identify a viewing angle of the electronic apparatus based on the acquired distance information,
adjust a travel velocity of the electronic apparatus based on the identified viewing angle being less than a threshold value,
identify a change in the viewing angle based on the travel of the electronic apparatus in real time, and
reduce the travel velocity of the electronic apparatus by a first predetermined ratio for a predetermined time based on a change ratio of the change in the viewing angle being the threshold value or more.

2. The electronic apparatus of claim 1, wherein the distance information comprises a plurality of distance values corresponding to different directions, and
wherein the processor is further configured to:
identify a distance increase section and a distance decrease section based on the plurality of distance values,
identify a plurality of directions in which the distance decrease section is changed to the distance increase section, and
identify the viewing angle of the electronic apparatus based on the plurality of directions.

3. The electronic apparatus of claim 2, wherein the processor is further configured to identify the viewing angle of the electronic apparatus based on an angle difference between a first direction and a second direction among the plurality of directions.

4. The electronic apparatus of claim 1, further comprising a memory configured to store velocity information corresponding to the identified viewing angle,
wherein the processor is further configured to:
identify the velocity information corresponding to the identified viewing angle, and
control the travel velocity of the electronic apparatus based on the identified velocity information.

5. The electronic apparatus of claim 1, wherein the processor is further configured to adjust the travel velocity of the electronic apparatus to a velocity corresponding to the viewing angle identified at an elapsed time point when the predetermined time elapses.

6. The electronic apparatus of claim 1, wherein the distance information comprises a plurality of distance values corresponding to different directions, and
wherein the processor is further configured to:
maintain the travel velocity of the electronic apparatus based on a minimum value of the plurality of distance values being a distance threshold or more, and
adjust the travel velocity of the electronic apparatus based on velocity information corresponding to the identified viewing angle based on the minimum value of the plurality of distance values being less than the distance threshold.

7. The electronic apparatus of claim 1, wherein the processor is further configured to:
reduce the travel velocity of the electronic apparatus by a second predetermined ratio based on the travel direction being changed to a threshold angle or more during the travel of the electronic apparatus, and adjust the travel velocity of the electronic apparatus based on velocity information corresponding to a viewing angle corresponding to the changed travel direction.

8. The electronic apparatus of claim 1, further comprising a memory configured to store map information corresponding to a travel space of the electronic apparatus, and wherein the processor is further configured to:

identify location information of the electronic apparatus on a map based on the map information during the travel of the electronic apparatus, identify a viewing angle corresponding to a current location of the electronic apparatus based on the location information of the electronic apparatus and location information of the sensed obstacle, the location information of the sensed obstacle being included in the map information, and adjust the travel velocity of the electronic apparatus based on the viewing angle corresponding to the current location.

9. The electronic apparatus of claim 1, further comprising a memory configured to store map information corresponding to a travel space of the electronic apparatus, wherein the processor is further configured to:

identify a travel path of the electronic apparatus based on the map information, and control the travel of the electronic apparatus based on the identified travel path.

10. A control method of an electronic apparatus, the method comprising:

acquiring distance information about a distance of the electronic apparatus to a sensed obstacle in a different direction based on:

a travel direction of the electronic apparatus, and sensing data received from a sensor during a travel of the electronic apparatus;

identifying a viewing angle of the electronic apparatus based on the acquired distance information;

adjusting a travel velocity of the electronic apparatus based on the identified viewing angle being less than a threshold value;

identifying a change in the viewing angle based on the travel of the electronic apparatus in real time; and reducing the travel velocity of the electronic apparatus by a first predetermined ratio for a predetermined time based on a change ratio of the viewing angle being the threshold value or more.

11. The control method of claim 10, wherein the distance information comprises a plurality of distance values corresponding to different directions, and wherein the identifying of the viewing angle comprises:

identifying a distance increase section and a distance decrease section based on the plurality of distance values, identifying a plurality of directions in which the distance decrease section is changed to the distance increase section, and identifying the viewing angle of the electronic apparatus based on the plurality of directions.

12. The control method of claim 11, wherein the identifying of the viewing angle comprises identifying the viewing angle of the electronic apparatus based on an angle difference between a first direction and a second direction among the plurality of directions.

13. The control method of claim 10, wherein the electronic apparatus comprises velocity information corresponding to the identified viewing angle, and wherein the adjusting of the travel velocity comprises:

identifying the velocity information corresponding to the identified viewing angle, and controlling the travel velocity of the electronic apparatus based on the identified velocity information.

14. The control method of claim 10, further comprising:

adjusting the travel velocity of the electronic apparatus to a velocity corresponding to the viewing angle identified at an elapsed time point when the predetermined time elapses.

15. The control method of claim 10, wherein the distance information comprises a plurality of distance values corresponding to different directions, and wherein the adjusting comprises maintaining the travel velocity of the electronic apparatus based on a minimum value of the plurality of distance values being a distance threshold or more, and adjusting the travel velocity of the electronic apparatus based on velocity information corresponding to the identified viewing angle based on the minimum value of the plurality of distance values being less than the distance threshold.

16. The control method of claim 10, further comprising:

reducing the travel velocity of the electronic apparatus by a second predetermined ratio based on the travel direction being changed to a threshold angle or more during the travel of the electronic apparatus, and adjusting the travel velocity of the electronic apparatus based on velocity information corresponding to a viewing angle corresponding to the changed travel direction.

17. The control method of claim 10, wherein the electronic apparatus comprises map information corresponding to a travel space of the electronic apparatus, and the method further comprising:

identifying location information of the electronic apparatus on a map based on the map information during the travel of the electronic apparatus;

identifying a viewing angle corresponding to a current location of the electronic apparatus based on the location information of the electronic apparatus and location information of the sensed obstacle, the location information of the sensed obstacle being included in the map information; and adjusting the travel velocity of the electronic apparatus based on the viewing angle corresponding to the current location.

18. The control method of claim 10, wherein the electronic apparatus comprises map information corresponding to a travel space of the electronic apparatus, the method further comprising:

identifying a travel path of the electronic apparatus based on the map information, and controlling the travel of the electronic apparatus based on the identified travel path.

* * * * *